Aug. 10, 1926.
S. C. RADFORD
1,595,618
SEALED RECEPTACLE
Filed Sept. 28, 1925
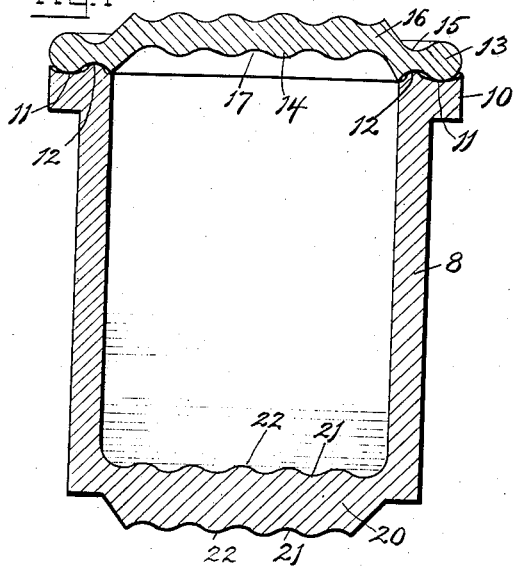
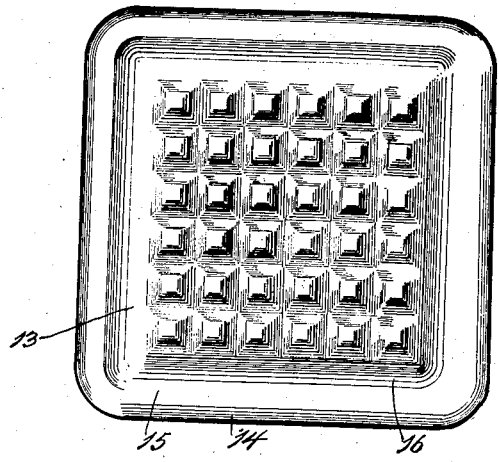
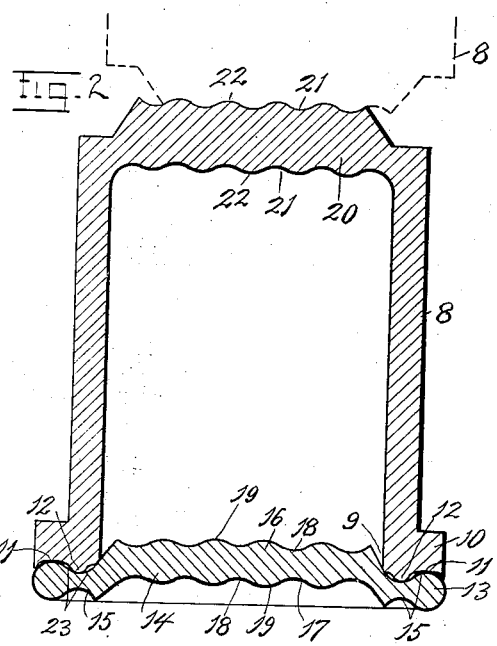
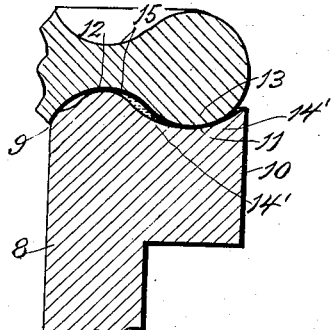
INVENTOR.
Stephen C. Radford
BY
Morsell, Keeney & Morsell
ATTORNEYS Patented Aug. 10, 1926.

1,595,618

UNITED STATES PATENT OFFICE.

STEPHEN C. RADFORD, OF OSHKOSH, WISCONSIN.

SEALED RECEPTACLE.

Application filed September 28, 1925. Serial No. 59,137.

This invention relates to improvements in sealed receptacles.

Receptacles now in ordinary use for containing food of various kinds are placed on shelves or in refrigerators in close proximity to each other. Food within the receptacles is very apt to absorb the flavors or odors of the food in adjacent receptacles, which is very objectionable. Furthermore, the strength and flavor of the food is often lost within comparatively a short time.

It is one of the objects of the present invention to overcome the above mentioned objectionable features and provide a sealed receptacle in which the food may be placed and the cover sealed thereon in a very simple manner.

A further object of the invention is to provide a sealed receptacle which may be used in an inverted position and in which the cover may also be used in an inverted position.

A further object of the invention is to provide a sealed receptacle having means for easily sealing the joint between the receptacle and its cover in either position of use.

A further object of the invention is to provide a sealed receptacle in which the receptacles may be stacked one above the other in a manner to be safely maintained in position.

A further object of the invention is to provide a sealed receptacle which is of simple construction, is strong and durable, and is well adapted for the purpose described.

With the above and other objects in view, the invention consists of the improved sealed receptacle and its parts and combinations as set forth in the claims, and all equivalents thereof.

In the accompanying drawing, in which the same reference characters indicate the same parts in all of the views:

Fig. 1 is a vertical sectional view of the improved receptacle and its cover shown in upright position;

Fig. 2 is a similar view with the parts shown in inverted position, the view also indicating by dotted lines another receptacle stacked on top of the first receptacle;

Fig. 3 is a top view of the cover; and

Fig. 4 is a sectional detail view on a larger scale of a portion of the receptacle and cover showing the manner of sealing the joint.

Referring to the drawing, the numeral 8 indicates a receptacle preferably formed of glass or like material, which is approximately of rectangular form, but may be of any other shape desired. The upper open end 9 of the receptacle is formed with an outwardly extending flange 10 and the upper surface of the flange is of reversed curved formation in cross section to provide a sealing groove 11 and a ridge 12, entirely around the upper edge of the receptacle. The groove 11 extends around the ridge 12 and is entered by the rounded edge portion 13 of the cover 14 which closes the receptacle. The cross diameter of the said rounded edge 13 is less than the cross diameter of the curve of the groove to form sealing spaces 14' therebetween. The edge portion of the cover is also formed with a groove 15 to receive the ridge 12 to provide a double contact and a double seal between the cover and the receptacle. As the upper edge portion of the cover is also formed with the rounded edge and groove 13 and 15 of the same shape as the lower edge, the cover may be used in inverted position on the receptacle. Said cover is also formed on one side with a raised part 16 and on its opposite side with a depression 17, so that the cover may be used as an independent dish when desired to hold or discharge moisture from the receptacle. When used as shown in Fig. 2, the moisture will flow inwardly and if the cover is inverted the moisture will be retained in the depressed portion of the cover. The surfaces of the opposite sides of the cover are formed with grooves and ridges 18 and 19 extending at right angles to each other on each surface, as shown in Fig. 3 to permit circulation of air beneath food resting on the cover. The grooves and ridges also provide for any moisture within the receptacle flowing from the grooves on one side into the sealing spaces 14 when the receptacle and cover are used in the position shown in Fig. 2.

The inner and outer sides of the bottom portion 20 of the receptacle are also provided with grooves and ridges 21 and 22, so that when one receptacle or cover is placed above or stacked on the other, the grooves and ridges will interfit as shown in Fig. 2, and the parts will be firmly held in position without liability of slipping.

When the receptacle is used in an inverted position as shown in Fig. 2, the groove 15 will be entered by the ridge 12 and the spaces 23 will form a double seal when filled with water.

In use it is only necessary to place the article of food in the receptacle and then pour water in the grooves to seal the joint between the cover and the receptacle. As both the receptacle and the cover are invertible, the parts may be used either side or end up and also used separately.

From the foregoing description it will be seen that the sealed receptacle is of very simple construction, and is well adapted for preventing food from absorbing odors from adjacent material and also for maintaining its own flavor and moisture intact, and thus better preserving the food.

What I claim as my invention is:

1. A sealed receptacle, comprising a receptacle having an open end and a ridge and groove in the edge portion of the receptacle which extend around the opening, a cover having an outer edge portion forming a ridge which extends into the groove and contacts with the portions of the receptacle forming the groove at a plurality of points, and also having a groove into which extends the ridge of the receptacle, said cover groove being depressed vertically from the surfaces on each side of said cover groove for holding a sealing medium in one position of use, and a sealing medium within the receptacle groove between one of the ridge portions of the cover and the edge portions of the receptacle.

2. A sealed receptacle, comprising an invertible receptacle having an open end and a groove in the edge portion of the receptacle which extends around the opening, and a cover invertible with relation to the receptable and having an edge portion formed with upper and lower ridges one of which extends into the groove and contacts with the portions of the receptacle forming the groove along a plurality of lines when the cover is placed on the receptacle either side up, and a liquid sealing medium within the groove between the cover ridge and the edge portions of the receptacle.

3. A sealed receptacle, comprising an invertible receptacle having an open end and a rounded groove and a ridge which extend around the opening, a cover invertible with relation to the receptacle and having a rounded edge and grooves on its opposite side portions adjacent the edge, said cover grooves being depressed vertically from the surfaces on each side of said groove, said rounded edge portion extending into the groove of the receptacle and the ridge, of the receptacle extending into one of the grooves of the cover to form points of contact and sealing spaces for holding a sealing medium in liquid form in either position of use between the cover and the receptacle when the cover is placed on the receptacle either side up, and a sealing medium within the sealing space.

4. A sealed receptacle, comprising an invertible receptacle having an open end and a rounded groove and a ridge which extend around the opening, a cover invertible with relation to the receptacle and having a rounded edge and grooves on its opposite side portions adjacent the edge, said cover grooves being depressed vertically from the surfaces on each side of said groove, said rounded edge portion extending into the groove of the receptacle and the ridge of the receptacle extending into one of the grooves of the cover to form points of contact and a sealing space on each side of the contacting portion of the rounded edge portion of the cover for holding a sealing medium in liquid form in either position of use, and a sealing medium within the sealing spaces.

5. A sealed receptacle, comprising an invertible receptacle having an open end and an outer rounded groove and an inner ridge which extend around the opening, an invertible cover having an outer rounded edge and inner grooves on its opposite side portions adjacent the edge, said rounded edge portion extending into the groove of the receptacle and the ridge of the receptacle extending into one of the grooves of the cover to form points of contact and a sealing space on each side of the contacting portion of the rounded edge portion of the cover, said receptacle and cover also having corrugated upper and lower surfaces, and a sealing medium within the sealing spaces.

6. A sealed receptacle, comprising an invertible receptacle having an open end and an outer rounded groove and an inner ridge which extend around the opening, an invertible cover having an outer rounded edge and inner grooves on its opposite side portions adjacent the edge, said rounded edge portion extending into the groove of the receptacle and the ridge of the receptacle extending into one of the grooves of the cover to form points of contact and a sealing space on each side of the contacting portion of the rounded edge portion of the cover, said receptacle and cover also having intersecting corrugated upper and lower surfaces, and a sealing medium within the sealing spaces.

7. A sealed receptacle, comprising an invertible receptacle having an open end and an outer groove and an inner ridge which extend around the opening, an invertible cover having an outer edge and inner grooves on its opposite side portions adjacent the edge, said edge portion extending into the groove of the receptacle and the ridge of the receptacle extending into one of the grooves of the cover to form points of contact and a sealing space on each side of the contacting portion of the edge portion of the cover, said receptacle and cover also having corrugated upper and lower surfaces, and a sealing medium within the sealing spaces.

8. A sealed receptacle, comprising an invertible receptacle having an open end and an outer groove and an inner ridge which extend around the opening, an invertible cover having an outer edge and inner grooves on its opposite side portions adjacent the edge, said edge portion extending into the groove of the receptacle and the ridge of the receptacle extending into one of the grooves of the cover to form points of contact and a sealing space on each side of the contacting portion of the edge portion of the cover, said receptacle and cover also having corrugated upper and lower surfaces and said cover being raised on one side and depressed on the other, and a sealing medium within the sealing spaces.

In testimony whereof, I affix my signature.

STEPHEN C. RADFORD.